(12) United States Patent
Ohchi et al.

(10) Patent No.: US 7,318,626 B2
(45) Date of Patent: Jan. 15, 2008

(54) HEAD RESTRAINT SUPPORTING STRUCTURE

(75) Inventors: Masato Ohchi, Toyota (JP); Kenichi Takenaka, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/985,888

(22) Filed: Nov. 12, 2004

(65) Prior Publication Data

US 2005/0127736 A1 Jun. 16, 2005

(30) Foreign Application Priority Data

Nov. 21, 2003 (JP) .......................... P2003-392681

(51) Int. Cl.
*A47C 1/10* (2006.01)

(52) U.S. Cl. ....................... 297/410; 297/391

(58) Field of Classification Search .......... 297/216.12, 297/216.14, 391, 463.1, 463.2, 452.18, 410, 297/452.2; 403/190, 391, 396, 270, 272, 403/191; 248/205.1, 434, 118
See application file for complete search history.

(56) References Cited

U.S. PATENT DOCUMENTS

| | | | | |
|---|---|---|---|---|
| 4,498,704 A | * | 2/1985 | Hildreth ...................... 297/397 |
| 4,844,544 A | * | 7/1989 | Ochiai ......................... 297/408 |
| 5,378,043 A | * | 1/1995 | Viano et al. ................ 297/408 |
| 5,556,129 A | * | 9/1996 | Coman et al. ............ 280/730.2 |
| 5,816,658 A | * | 10/1998 | Wallis ......................... 297/410 |
| 6,074,010 A | * | 6/2000 | Takeda ........................ 297/391 |
| 6,199,900 B1 | * | 3/2001 | Zeigler ........................ 280/735 |
| 6,454,356 B1 | * | 9/2002 | Yamada ....................... 297/410 |
| 6,641,219 B2 | * | 11/2003 | Meshke et al. ............. 297/391 |
| 6,655,733 B2 | * | 12/2003 | Humer et al. ........... 297/216.12 |
| 6,719,368 B1 | * | 4/2004 | Neale ..................... 297/216.14 |
| 6,783,177 B1 | * | 8/2004 | Nakano .................. 297/216.12 |
| 6,789,846 B2 | * | 9/2004 | Humer et al. .......... 297/216.12 |
| 6,832,816 B2 | * | 12/2004 | Yamada ....................... 297/391 |
| 6,840,560 B2 | * | 1/2005 | Flogard ...................... 296/68.1 |
| 6,866,339 B2 | * | 3/2005 | Itoh ....................... 297/216.13 |
| 6,955,397 B1 | * | 10/2005 | Humer .................... 297/216.12 |

FOREIGN PATENT DOCUMENTS

| | | |
|---|---|---|
| JP | A-11-216037 | 8/1999 |
| JP | A 2000-102444 | 4/2000 |

* cited by examiner

*Primary Examiner*—David Dunn
*Assistant Examiner*—Erika Garrett
(74) *Attorney, Agent, or Firm*—Oliff & Berridge, PLC.

(57) ABSTRACT

Head restraint supporting structure of the present invention is such that a head restraint bracket supporting a head restraint is secured to a seat back frame, a stay of the head restraint being inserted into the head restraint bracket. Wherein the head restraint bracket is formed into a tubular shape by joining two end portions of a plate material having been bent, and is secured to the front face of the seat back frame so that junction between the two end portions abuts against the seat back frame. A reinforcement structure is formed at the upper end of the junction. This reinforcement structure prevents the upper end of the junction from being opened by a load being applied to the head restraint, thereby allowing the head restraint 9 to restrain reliably the rearward movement of occupant's head and hence to reliably protect the occupant's neck.

10 Claims, 7 Drawing Sheets

HEAD RESTRAINT SUPPORTING STRUCTURE

BACKGROUND OF THE INVENTION

1. Field of the Invention

The present invention relates to a head restraint supporting structure that is provided in a seat member installed in a vehicle for the purpose of protecting occupants at the time of collision.

2. Related Background Art

In a seat back of a seat installed in a vehicle, a head restraint is provided to protect a neck and head of occupants. As a supporting structure for the head restraint, there is conventionally the one disclosed in Japanese patent Application Laid-Open No. 2000-102444. As shown in FIG. 7, this head restraint supporting structure 30 has brackets 33 secured to a frame 32 inside a seat back 31. Insertion of stays 35 into the brackets 33 makes the seat back 31 to support the head restraint 34. Generally, such a bracket is formed by joining two end portions of a plate material by welding or the like after bending or rolling up the plate material. And a face with a junction (seam) between the two end portions formed thereon is joined to a seat back frame by welding or the like.

SUMMARY OF THE INVENTION

When a heavy load is applied to a head restraint on occasion of a vehicle collision or the like, and the rearward movement of occupant's head is restrained, a bracket may be loaded heavily via stays of the head restraint. In this case, the head restraint supporting structure of FIG. 7 causes the stay to act as a lever so as to open the above-noted junction of a bracket on the vehicle's rear side. This produces a problem that the withstand load of the bracket is reduced.

Further, in welding process of a head restraint bracket to a frame, spatters (metal particles flying like sparks when molten) are inevitably generated when the junction of a bracket is welded to the frame (i.e., welding along the frame). In order to prevent the spatters generated from entering into the bracket through the gap of the junction, welding must be conducted on the side of the bracket (i.e., welding along the bracket), not on the junction portion, which produces a problem that sufficient welding strength can not be obtained.

In view of the above, the object of the present invention is to provide a head restraint supporting structure, which prevents the junction of a head restraint supporting bracket from being opened and thus enhances the relevant strength, and moreover enables to weld a bracket to a frame with high strength.

The head restraint supporting structure of this invention is such that a head restraint bracket supporting the head restraint is secured to a seat back frame and that a stay of the head restraint is inserted into the head restraint bracket, wherein the head restraint bracket is formed into a tubular shape by welding the two end portions of a plate material having been bent, and is secured to the front face of the seat back frame in such a way, that the junction between the two end portions abuts against the seat back frame, while a reinforcement structure is formed on the upper end of the junction to reinforce the junction upper end.

According to the head restraint supporting structure of this invention, the junction of a head restraint bracket is arranged so as to face rearwards and a reinforcement structure is formed on the upper end of the head restraint bracket to reinforce this junction upper end. Owing to this, even when a vehicle collision applies a load from the front, the reinforcement structure thus formed prevents distortion of the head restraint supporting bracket, i.e., opening of the junction upper end. This means enhancing the relevant strength and enabling to weld the bracket to the frame with high strength.

In this regard, the reinforcement structure is preferably formed by a reinforcement member being attached to the upper end of the junction from the back side. Thus, a reinforcement member (e.g., a plate material provided separately in addition to the head restraint bracket) provided behind the head restraint bracket enables formation of a reinforcement structure.

It is preferable that the reinforcement member is a plate and is weld-bonded to the face with the junction formed thereon, that a seat back frame is sandwiched between the head-restraint bracket and the reinforcement member, and that the reinforcement member has a breadth greater than that of the head restraint bracket.

In addition, the reinforcement structure is preferably formed by joining superposed end portions of a plate material constituting the head restraint bracket. Thus, the superposed end portions of the head restraint bracket can also form the reinforcement structure. In this regard, to join the head restraint bracket to the seat back frame is made preferably by welding along the seat back frame.

The reinforcement structure is preferably formed by joining the upper end of the head restraint bracket to the seat back frame. Opening of the junction, if it happens, begins from its upper end portion. Therefore the seat back frame abutted against the upper end of the head restraint bracket can also form the reinforcement structure.

Another head restraint supporting structure of this invention is such that a head restraint bracket supporting the head restraint is secured to a seat back frame and that a stay of the head restraint is inserted into the head restraint bracket, wherein the head restraint bracket is formed into a tubular shape by joining the two end portions of a plate material having been bent, and is secured to the front face of the seat back frame so that the junction of the two end portions faces sideways or forwards.

According to the head restraint supporting structure of this invention, the junction of the head restraint bracket is arranged at the side or ahead of the head restraint bracket. This prevents spatters from entering the head restraint bracket even when welding the rear part of the head restraint bracket, since there is no junction behind the head restraint bracket. Thus, the junction portion of the head restraint bracket with the seat back frame is formed preferably by welding along the seat back frame (i.e., welding of the rear face of the head restraint bracket) Further, a load applied to the head restraint is the one that is received from an occupant's head, which is to be directed rearwards. Therefore the junction which may have inferior strength can be shifted apart from a maximally loaded location, by means of the fact that the junction of the head restraint bracket is arranged at the side or ahead of the head restraint bracket. This in turn prevents distortion of the head restraint bracket, and accordingly enhances the relevant strength, enabling to weld the bracket to the frame with high strength.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
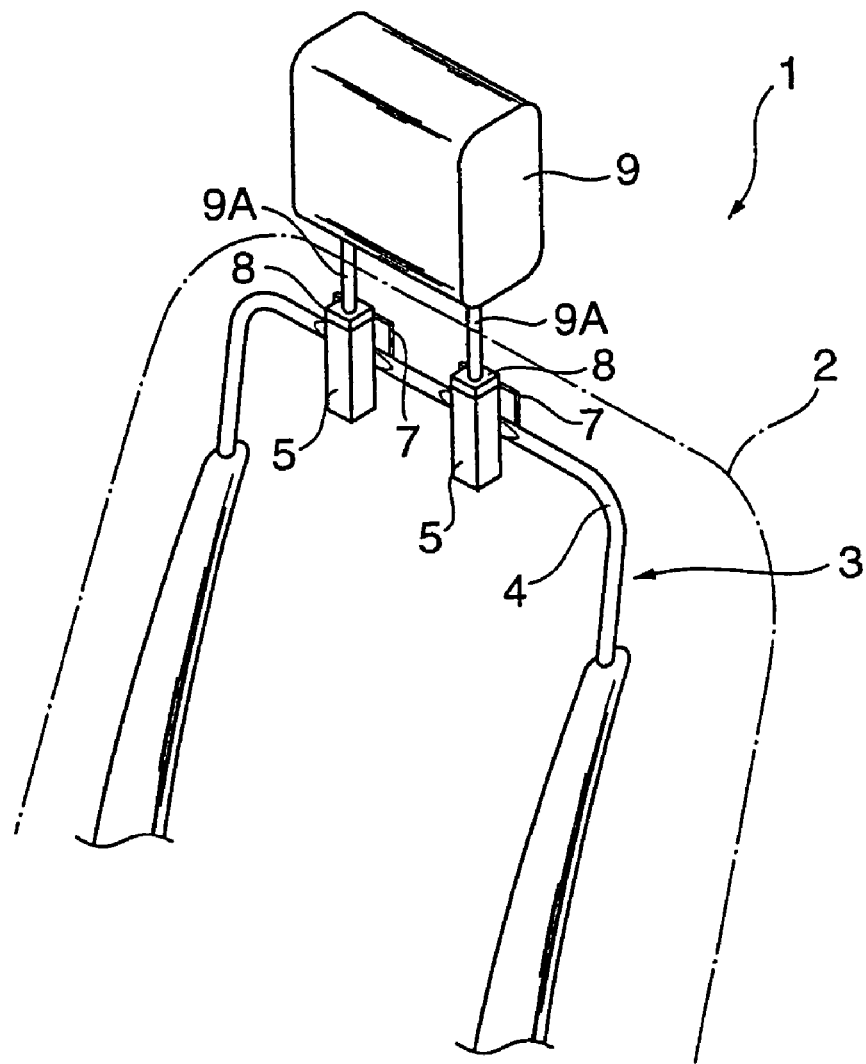
FIG. 1 is a perspective view of a head restraint supporting structure according to a first embodiment of this invention.

Preferred embodiments of the present invention will now be described hereinafter with reference to the accompanying drawings. In each embodiment, parts with the same functions are designated with the same reference characters, and accordingly, the same descriptions will not be repeated.

FIG. 1 is a perspective view of a head restraint supporting structure according to a first embodiment of this invention. As shown in FIG. 1, the head restraint supporting structure 1 of this embodiment is, for example, the one that is provided in a vehicle such as a motor vehicle and attached to a seat equipped with a seat cushion (not shown) and a seat back 2. Inside the seat cushion there is provided a seat cushion frame. And inside the seat back 2 there is provided a seat back frame 3.

Figure 2:
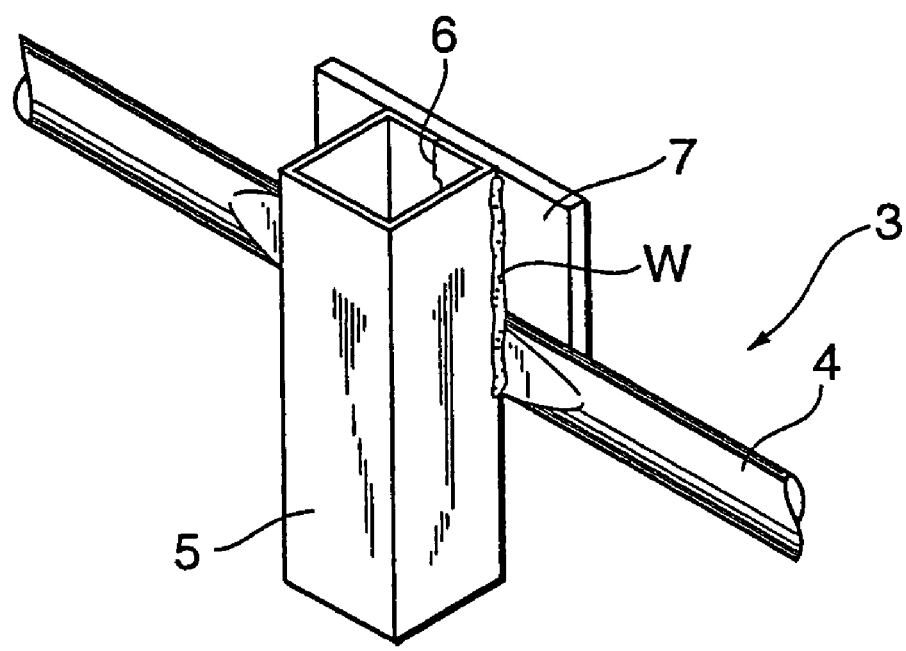
FIG. 2 is a perspective view of junction between a head restraint bracket and a seat back frame in a head restraint supporting structure according to the first embodiment of this invention.

To an upper pipe 4 arranged at the upper part of the seat back frame 3 are attached a pair of head restraint brackets 5. Each head restraint bracket 5 is, as shown in FIG. 2, formed by bending a plate material and constructed by joining via welding two end portions of the plate having been bent. Each head restraint bracket 5 is of a tubular shape with a rectangular profile section. Each head restraint bracket 5 is arranged such that a junction 6 faces rearwards, and the face with the junction 6 formed thereon is welded to the seat back frame 3 (welded portion W).

On the opposite side (rear position) of the seat back frame 3 in reference to each head restraint bracket 5, a reinforcement plate 7 is respectively welded as a reinforcement member. Reinforcement plates 7 are arranged in such a way as to extend up to the upper end portion of the brackets 5. The width of the reinforcement plates 7 is greater than that of the head restraint bracket 5. Reinforcement plate 7 is welded via arc welding to the back face side of the seat back frame 3. Reinforce plate 7 is further welded to the head restraint bracket 5 across the area from the middle position in the height direction to the upper end portion of the head restraint bracket 5 (welded part W).

As shown in FIG. 1, into the upper end portion of each head restraint bracket 5 is respectively inserted and fitted a support bracket S. At a central part of each support bracket 8 there is formed a fitting bore respectively, into which a stay 9A of the head restraint 9 is inserted respectively. Thus, stays 9A of each head restraint 9 are respectively inserted into each head restraint bracket 5 via support bracket 8, whereby the head restraint 9 is supported by the seat back frame 3.

The operations of the head restraint supporting structure of this embodiment having the above-described structure will now be discussed below. In the head restraint supporting structure according to this embodiment, a reinforcement plate 7 is respectively provided behind each head restraint bracket 5. Provision of the reinforcement plates 7 widens the area of load distribution and hence prevents opening of the junction 6 (especially its upper end).

The width of the reinforcement plate 7 is made greater than the breadth of the head restraint bracket 5. This allows the head restraint bracket 5 and the reinforcement plate 7 to be welded together at the side of the rear part of the head restraint bracket 5 (welded part W along the head restraint bracket 5). This prevents spattering at the junction 6 so that no spatters enter into the head restraint bracket 5, thereby allowing the head restraint bracket 5 and the seat back frame 3 to be welded together via reinforcement plate 7.

In addition, reinforcement plate 7 extends up to the upper end portion of the head restraint bracket 5, and is welded thereto. Splitting open of the junction of the head restraint bracket 5 begins mostly from its upper end portion. But with this embodiment, reinforcement plate 7 is welded up to the upper end portion of the head restraint bracket (welded part W). This enhances the relevant strength up to the upper end portion of the head restraint bracket 5, thereby preventing more conveniently the junction 6 from being opened. This allows the head restraint 9 to reliably restrain the rearward movement of occupant's head and hence to reliably protect the occupant's neck.

Figure 3:
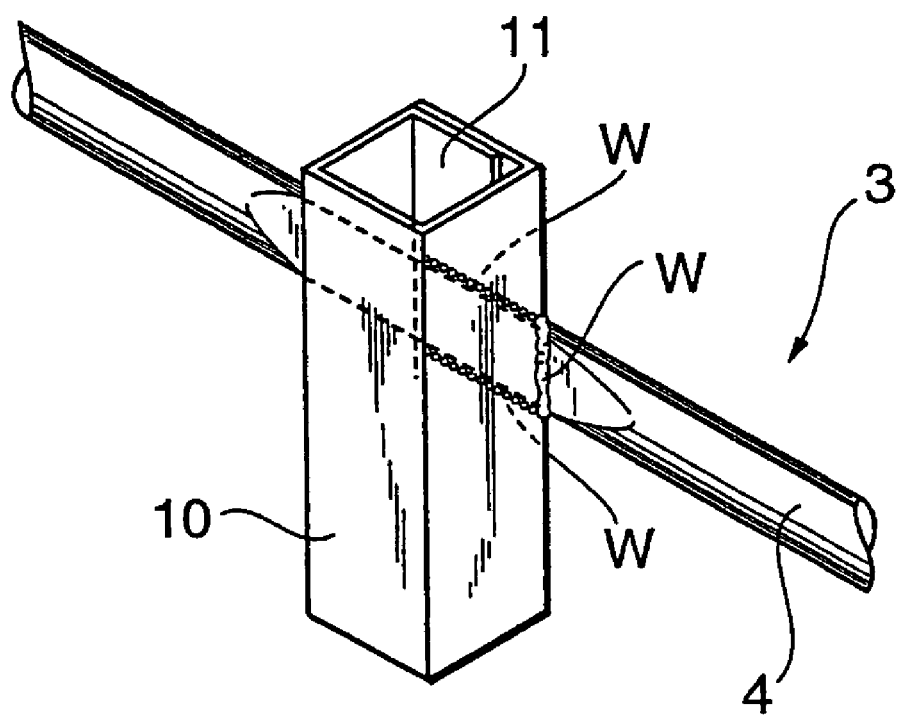
FIG. 3 is a perspective view of junction between a head restraint bracket and a seat back frame in a head restraint structure according to a second embodiment of this invention.

Next, a second embodiment of this invention will be discussed below. FIG. 3 is a perspective view of junction between a head restraint bracket and a seat back frame in a head restraint supporting structure of the second embodiment of this invention. The head restraint supporting structure of this embodiment differs in the structure of head restraint bracket, as compared with a conventional head restraint supporting structure.

A bead restraint bracket 10 in the head restraint supporting structure of this embodiment is, as shown in FIG. 3, formed by bending a plate material and of a tubular shape having a rectangular profile section. In the head restraint bracket 10, two end portions are superposed in the process of bending a plate material, and then the superposed parts are welded together so as to constitute junction 11. Junction 11 is achieved by spot-welding at the superposed part of the plate material or by arc-welding at the end portions of the plate material. The head restraint bracket 10 is welded to the upper pipe 4 of the seat back frame 3 (welded part W) at this junction 11. About the other structures of this embodiment, this head restraint supporting structure has the same constitution as said conventional head restraint supporting structure.

The operations of the head restraint supporting system of this embodiment with the above-described constitution will now be discussed below. In the head restraint supporting structure of this embodiment, the junction 11 of the head restraint supporting bracket 10 is made to be a structure of a plate material being doubly superposed, and this junction 11 is welded to the upper pipe 4 of the seat back frame. The junction 11 with such a doubled constitution reduces the possibility for the junction 11 to be opened even when the head restraint 9 is loaded, and enhances the relevant strength.

In the case of joining the junction 11 via spot-welding described above, no spatters will be generated at the time of welding the junction 11 to the upper pipe 4. In the case of welding the junction via arc-welding described above, even if there would be generated spatters at the time of welding the junction 11 to the upper pipe 4, doubling of the junction 11 would prevent the spatters from entering into the head restraint bracket 10. Therefore, that the head restraint bracket 10 is welded to the upper pipe 4 of the seat back frame 3 on the side of the back face of the head restraint bracket 1 allows the head restraint bracket 10 to be reliably joined to the seat back frame 3. Consequently, the head restraint 9 restrains reliably the rearward movement of occupant's head, thereby protecting reliably the occupant's neck.

Figure 4:
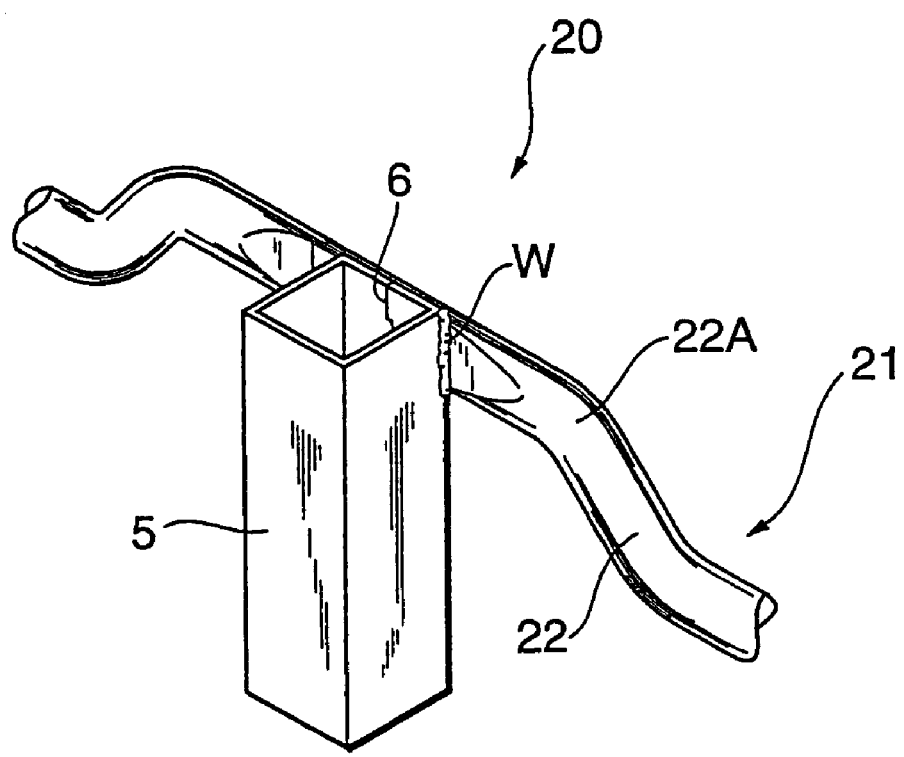
FIG. 4 is a perspective view of junction between a head restraint bracket and a seat back frame in a head restraint supporting structure according to a third embodiment of this invention.

Next, a third embodiment of this invention will now be discussed below. FIG. 4 is a perspective view of junction between a head restraint bracket and a seat back frame in a head restraint supporting structure of the third embodiment of this invention. The head restraint supporting structure of this embodiment differs in the structure of seat back frame, as compared with a conventional head restraint supporting structure.

As shown in FIG. 4, the head restraint supporting structure 20 of this embodiment comprises a seat back frame 21, to which the head restraint bracket 5 is to be welded. Upper pipe 22 of a seat back frame 21 comprises a bent part 22A at the portion to which each head restraint bracket 5 is to be attached. Bent part 22A is arranged at a higher position, and to the bent pert 22A is welded the upper end portion of the head restraint bracket 5.

The operations of the head restraint supporting structure of this embodiment with the constitution described above will now be discussed below. In the head restraint supporting structure 20 of this embodiment, each bent part 22A of the upper pipe 22 of the seat back frame 21 is arranged at a higher position, and to each bent part 22A is respectively joined the upper end portion of the head restraint bracket 5. Thus, the reinforced upper end of the junction 6 conveniently prevents the junction 6 from being opened from the upper end of the junction. This allows the head restraint 9 to reliably restrain the rearward movement of occupant's head, and hence to reliably protect the occupant's neck.

One conceivable aspect contemplates joining the upper end portion of the head restraint bracket 5 to the upper pipe 22 by simply moving the entirety of the horizontal part of the upper pipe 22 of the seat back frame 21. In contrast, in the head restraint supporting structure 20 of this embodiment, only the portion, to which each head restraint bracket 5 is to be attached, of the upper pipe 22 is bent and arranged at a higher position. This allows the upper end portion of the head restraint bracket 5 to be welded to the upper pipe 22 of the seat back frame 21 while not increasing the height of the shoulder of the seat and keeping the height of the seat unchanged.

Figure 5:
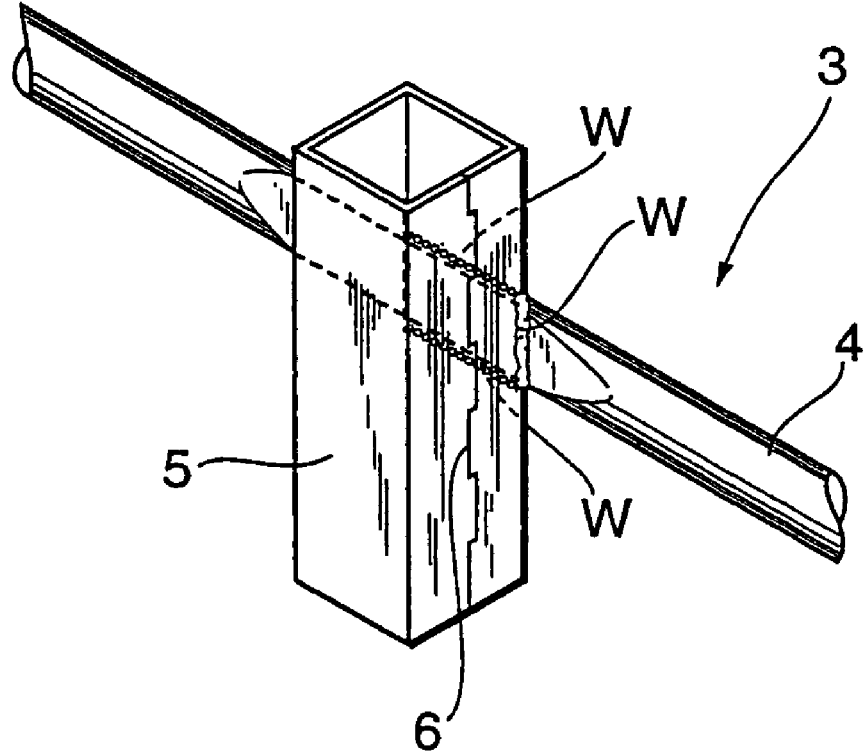
FIG. 5 is a perspective view of junction between a head restraint bracket and a seat back frame in a head restraint structure according to a fourth embodiment of this invention.

Subsequently, a fourth embodiment of this invention will now be discussed below. FIG. 5 is a perspective view of junction between a head restraint bracket and a seat back frame in a head restraint supporting structure of the fourth embodiment of this invention. The head restraint supporting structure of this embodiment differs mainly in the attaching structure for the head restraint bracket, as compared with said first embodiment.

As shown in FIG. 5, in the head restraint supporting structure according to this embodiment, to the upper pipe of the seat back frame 3 is welded the rear part of the head restraint bracket 5 (welded part W). In this regard, the head restraint bracket 5 comprises junction 6. Junction 6 is arranged so as to face sideways and is arranged on the adjacent face of the face welded to the upper pipe 4. About the other structures of this embodiment, this head restraint supporting structure has the same constitution as said conventional head restraint supporting structure.

The operations of the head restraint supporting structure according to this embodiment with the above-described constitution will now be discussed below. In the head restraint supporting structure of this embodiment, junction 6 is arranged so as to face sideways, and head restraint bracket 5 is welded to the seat back frame 3 at its surface without junction 6. This prevents the junction 6 from being loaded too heavily in case of a load being applied to the head restraint, since junction 6 is not welded to the seat back frame 3. This in turn prevents the head restraint bracket 5 from being damaged by the junction 6 being opened. And this allows the head restraint 9 to restrain reliably the rearward movement of occupant's head, thereby reliably protecting the occupant's neck.

Figure 6:
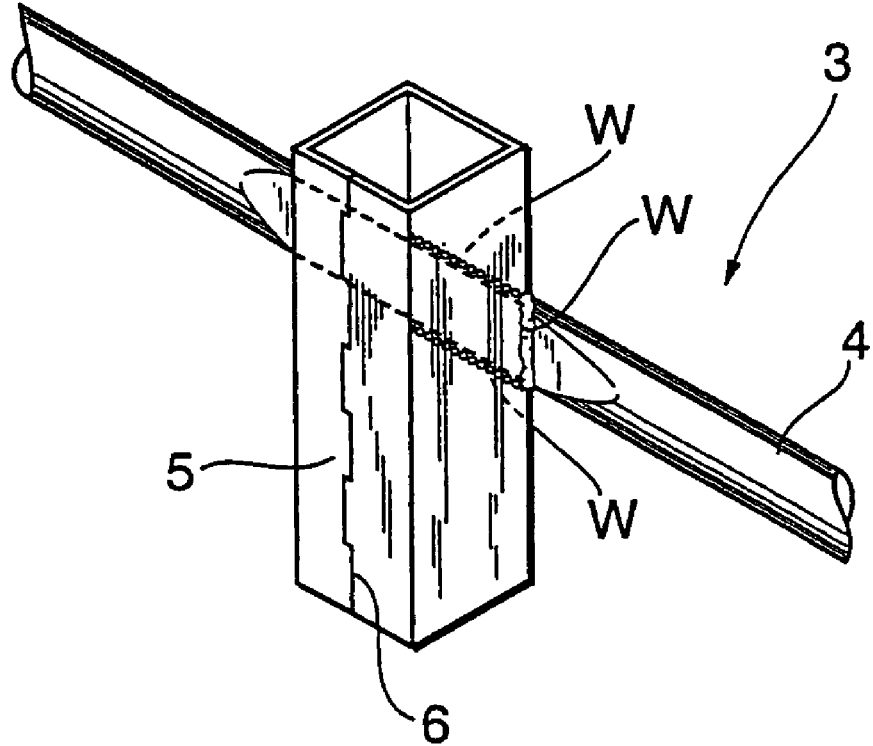
FIG. 6 is a perspective view of junction between a head restraint bracket and a seat back frame in a head restraint supporting structure according to a fifth embodiment of this invention.
Figure 7:
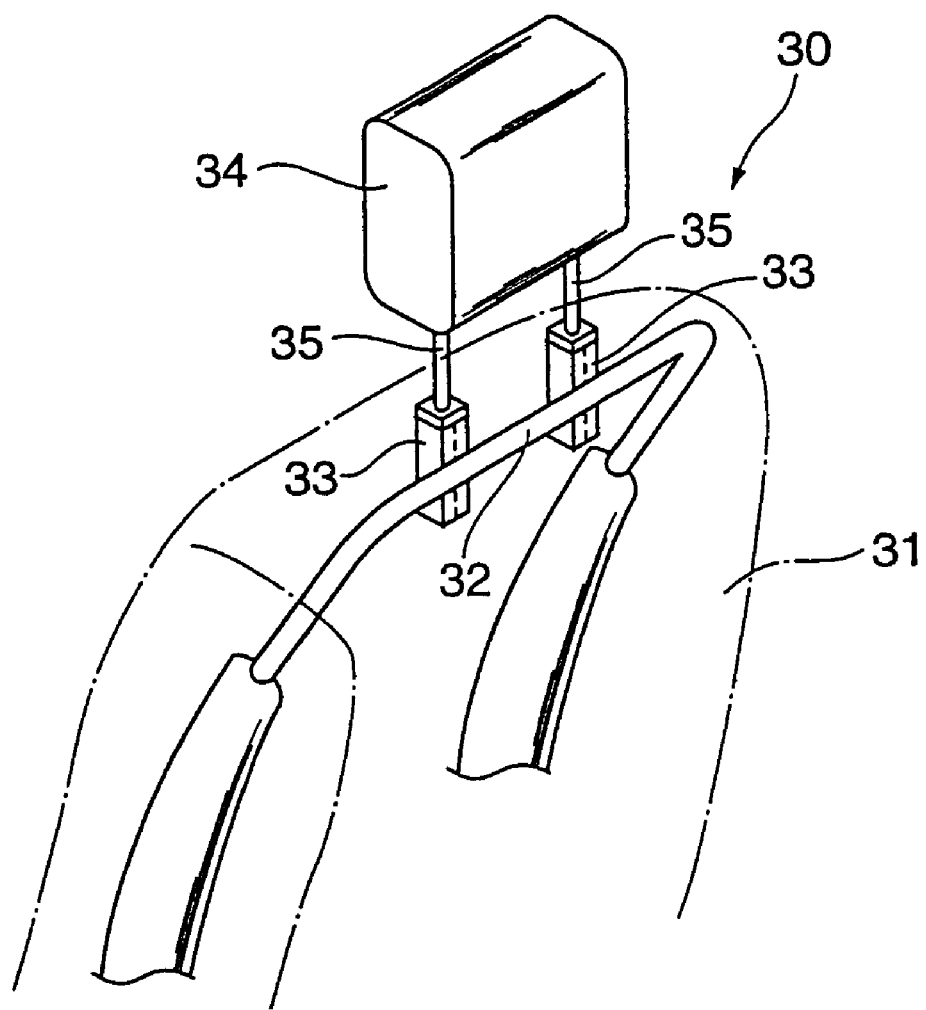
FIG. 7 is a perspective view of a conventional head restraint supporting structure.

In the head restraint supporting structure of this embodiment, the head restraint bracket 5 can be reliably welded to the seat back frame 3 at the face, on which junction 6 is not formed, of the head restraint bracket 5. This prevents spattering at the junction 6, allowing the head restraint bracket 5 and the seat back frame 3 to be welded without spatters entering into the head restraint bracket 5. In this embodiment, the junction 6 of the head restraint bracket 5 is arranged laterally, but can also be arranged in front with the same effects being achieved. With respect to this case, junction between the head restraint bracket and the seat back frame is shown in a perspective view of FIG. 6. Constitution of each part of this embodiment is the same as in the above-described embodiment of FIG. 5 except the orientation of the junction 6, and each part is designated with the same reference character and will not be discussed in detail.

Although, in the above, preferred embodiments of the present invention has been described, this invention is not to be construed to be limited to these embodiments. For example, while these embodiments contemplate a head restraint bracket of a type of rectangular profile section, a type of circular or elliptical profile section is also possible. Further, an aspect contemplating combining the above-mentioned embodiments is also possible.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A head restraint supporting structure, in which a head restraint bracket supporting a head restraint is secured to a seat back frame, a stay of the head restraint being inserted into said head restraint bracket;
   wherein said head restraint bracket is formed into a tubular shape by joining two end portions of bent plate material, and secured to a front face of said seat back frame so that a junction between said two end portions abuts against said seat back frame; and
   wherein a reinforcement structure to reinforce and cover the junction from the frame up to an upper end of said junction is added to the bent plate material.

2. A head restraint supporting structure of claim 1, wherein said reinforcement structure is formed by a reinforcement member being attached to the upper end of said junction from a back face side of the seat back frame.

3. A head restraint supporting structure, in which a head restraint bracket supporting a head restraint is secured to a seat back frame, a stay of the head restraint being inserted into said head restraint bracket;
   wherein said head restraint bracket is formed into a tubular shape by joining two end portions of bent plate material, and secured to a front face of said seat back frame so that a junction between said two end portions abuts against said seat back frame; and
   a reinforcement structure to reinforce and cover an upper end of the junction at the upper end of said junction is added to the bent plate material,
   wherein said reinforcement structure is formed by a reinforcement member being attached to the upper end of said junction from a back face side of the seat back frame, and wherein said reinforcement member is a plate material and is weld-bonded to the face with said junction formed thereon.

4. A head restraint supporting structure, in which a head restraint bracket supporting a head restraint is secured to a seat back frame, a stay of the head restraint being inserted into said head restraint bracket;
   wherein said head restraint bracket is formed into a tubular shape by joining two end portions of bent plate material, and secured to a front face of said seat back frame so that a junction between said two end portions abuts against said seat back frame; and
   a reinforcement structure to reinforce and cover an upper end of the junction at the upper end of said junction is added to the bent plate material.
   wherein said reinforcement structure is formed by a reinforcement member being attached to the upper end of said junction from a back face side of the seat back frame, and,
   wherein said reinforcement member is a plate material, and said seat back frame is sandwiched between said head restraint bracket and said reinforcement member.

5. A head restraint supporting structure, in which a head restraint bracket supporting a head restraint is secured to a seat back frame, a stay of the head restraint being inserted into said head restraint bracket;
   wherein said head restraint bracket is formed into a tubular shape by joining two end portions of bent plate material, and secured to a front face of said seat back frame so that a junction between said two end portions abuts against said seat back frame; and
   a reinforcement structure to reinforce and cover an upper end of the junction at the upper end of said junction is added to the bent plate material,
   wherein said reinforcement structure is formed by a reinforcement member being attached to the upper end of said junction from a back face side of the seat back frame, and
   wherein said reinforcement member is a plate material and has a breadth greater than that of said head restraint bracket.

6. A head restraint supporting structure, in which a head restraint bracket supporting a head restraint is secured to a seat back frame, a stay of the head restraint being inserted into said head restraint bracket;
   wherein said head restraint bracket is formed into a tubular shape by joining two end portions of bent plate material, and secured to a front face of said seat back frame so that a junction between said two end portions abuts against said seat back frame;
   wherein a reinforcement structure to reinforce an upper end of the junction at the upper end of said junction is formed; and
   wherein said reinforcement structure is formed by superposing and joining said two end portions of said plate material so that one end portion covers a significant amount of the other end portion.

7. A head restraint supporting structure of claim 6, wherein said head restraint bracket is joined to said seat back frame by welding along said seat back frame.

8. A head restraint supporting structure, in which a head restraint bracket supporting a head restraint is secured to a seat back frame, a stay of the head restraint being inserted into said head restraint bracket;
   wherein said head restraint bracket is formed into a tubular shape by joining two end portions of bent plate material, and secured to a front face of said seat back frame so that a junction between said two end portions abuts against said seat back frame;
   wherein a reinforcement structure to reinforce an upper end of the junction at the upper end of said junction is formed; and
   wherein said reinforcement structure is formed by being shaped by joining an upper end of said head restraint bracket to a bent part that extends above a horizontal pipe of said seat back frame.

9. A head restraint supporting structure, in which a head restraint bracket supporting a head restraint is secured to a seat back frame, a stay of the head restraint being inserted into said head restraint bracket,
   wherein said head restraint bracket is formed into a tubular shape by joining two end portions of bent plate material, and secured to a front face of said seat back frame so that a junction of said two end portions faces sideways or forwards relative to the front face of said seat back frame.

10. A head restraint supporting structure of claim 9, wherein said head restraint bracket is joined to said seat back frame by welding along said seat back frame.

* * * * *